United States Patent [19]

Waggoner

[11] 4,119,847

[45] Oct. 10, 1978

[54] CALIBRATOR FOR RADIOACTIVITY WELL LOGGING TOOLS

[75] Inventor: James A. Waggoner, Houston, Tex.

[73] Assignee: Schlumberger Technology Corporation, New York, N.Y.

[21] Appl. No.: 736,660

[22] Filed: Oct. 28, 1976

[51] Int. Cl.² .............................................. G01D 18/00
[52] U.S. Cl. .................................... 250/252; 250/493
[58] Field of Search ................ 250/252, 493, 494, 496

[56] References Cited

U.S. PATENT DOCUMENTS

| 2,829,636 | 4/1958 | Henschke | 250/494 X |
| 3,435,215 | 3/1969 | Pritchett | 250/252 X |
| 3,567,943 | 3/1971 | Wallhausen et al. | 250/493 |

Primary Examiner—Archie R. Borchelt
Attorney, Agent, or Firm—Schlumberger Limited

[57] ABSTRACT

A radioactivity well logging tool including a gamma radiation detector is field calibrated with the help of a flexible sheet having a radioactive substance dispersed therein, which is wrapped about the tool so as to completely surround the detector. The sheet is made of an elastomer such as polyurethane, and the radioactive substance is carnotite. This sheet is placed within a nylon sheath which has straps for holding the calibrator wrapped around the tool.

8 Claims, 3 Drawing Figures

4,119,847

CALIBRATOR FOR RADIOACTIVITY WELL LOGGING TOOLS

BACKGROUND OF THE INVENTION

The present invention relates to radioactivity well logging and is particularly directed to methods and apparatus for calibrating radioactivity well logging tools having a gamma ray detector. The invention is particularly useful for calibrating logging instruments that measure the natural radioactivity of earth formations.

The surveying of earth formations by detection of the natural radioactivity of said formations is presently well known and in widespread use. Such surveying is generally accomplished by moving a radiation detector through a well bore and establishing a record of the natural gamma radioactivity as a function of the borehole depth. This record can then be used to determine the interfaces between different formations, to relate formations observed from one borehole with formations in the same field that have been observed from other boreholes, and to provide depth references within a borehole.

It is also presently well known to detect the natural radioactivity of an earth formation within several appropriately selected energy windows and to combine the measured count rates in each window in order to determine the amounts of uranium, thorium and potassium present in the formation. The technique is described in U.S. Pat. No. 3,976,878, issued Aug. 24, 1976 to P. Chevalier et al. and assigned to the assignee of the present invention.

The natural gamma radioactivity of earth formations can further be used to provide quantitative shale indications. Typically, the count rate that reflects the natural radioactivity of a formation is normalized to a standard natural gamma radiation count rate observed in pure shale. The normalized signal is then considered as reflecting the shale concentration. Such a technique is disclosed in U.S. Pat. No. 3,786,267 to O. Y. Liu et al., issued Jan. 15, 1974 and assigned to the assignee of the present invention.

The use of natural radioactivity measurements to compare radioactive levels between wells, to determine the concentrations of uranium, thorium and potassium and to provide quantitative shale measurements requires that the instruments for performing such measurements be accurately calibrated.

Before being sent to the field, a natural radioactivity well logging instrument may be calibrated in a pit which simulates an earth formation and is made of concrete or cement blocks containing known amounts of uranium, thorium and potassium. The radioactive zone is thick enough to appear infinite to gamma ray detectors. Typically, the thickness of the pit wall is set at two feet.

Field calibration of the natural radioactivity logging tools is generally accomplished by placing a standard gamma ray source (typically of radium 226) at a standard distance (typically 53 inches) from the detector and adjusting the gain of the system so as to obtain a predetermined reading on a measuring apparatus. Unfortunately, the accuracy of this calibration technique is strongly affected not only by the asymmetry of the detector, but also, and chiefly, by a scattering effect due to the tool itself and to its surroundings (drill pipes, catwalks, etc.) that also receive gamma rays which may be redirected toward the detector. As a consequence of these effects, the calibration errors may reach 10%. For this reason, although natural gamma ray logging has been used by the oil industry for more than thirty years, natural radioactivity logs have never been in widespread use for quantitative measurements. A need exists, therefore, for a more accurate field calibration of the natural radioactivity logging tools. Moreover, as the calibration source is positioned at a relatively long distance from the detector, it must be relatively strong (100μCi) and can thus be a health hazard.

The above-described calibration pit avoids both the undesired scattering effect from nearby objects and the errors due to the asymmetry of the detector, but it is obviously not portable and therefore cannot be used as a field calibrator. It must be added that the purpose of a calibration pit is to simulate an earth formation, whereas the purpose of a field calibrator is to produce a specified count rate when in place, to check that the detection system is performing satisfactorily.

It is therefore an object of the present invention to provide novel methods and apparatus for more accurately calibrating in the field a natural radioactivity logging tool or, more generally, any radioactivity logging tool having a gamma ray detector.

SUMMARY OF THE INVENTION

In accordance with the invention, a radioactivity well logging tool including a gamma radiation detector is field calibrated with the help of a flexible sheet which has a radioactive substance dispersed therein, and which is wrapped about the tool so as to completely surround the detector.

More specifically, the sheet is made of a resilient material, such as an elastomer, and is of sufficient size so as to extend above and below the detector. The radioactive substance dispersed within the flexible sheet is preferably carnotite.

The radioactive sheet is advantageously covered with a flexible sheath, made of nylon, for example. Appropriate straps or fasteners are attached to this sheath and serve to hold the calibrator wrapped about the tool.

An inexpensive, light, compact and durable calibrator thus becomes available. It is also quite apparent that, as the radioactive source is brought very close to the detector and surrounds it completely, the scattering effect from nearby objects and the errors due to the asymmetry of the detector is avoided. An accurate field calibration of the tool can thus be performed. Furthermore, since the source can obviously be made considerably weaker than the calibration sources now in use, health hazards are reduced.

The present invention, together with further characteristics thereof, may best be understood by reference to the following description taken in conjunction with the accompanying drawings.

DESCRIPTION OF THE PREFERRED EMBODIMENT

Figure 1:
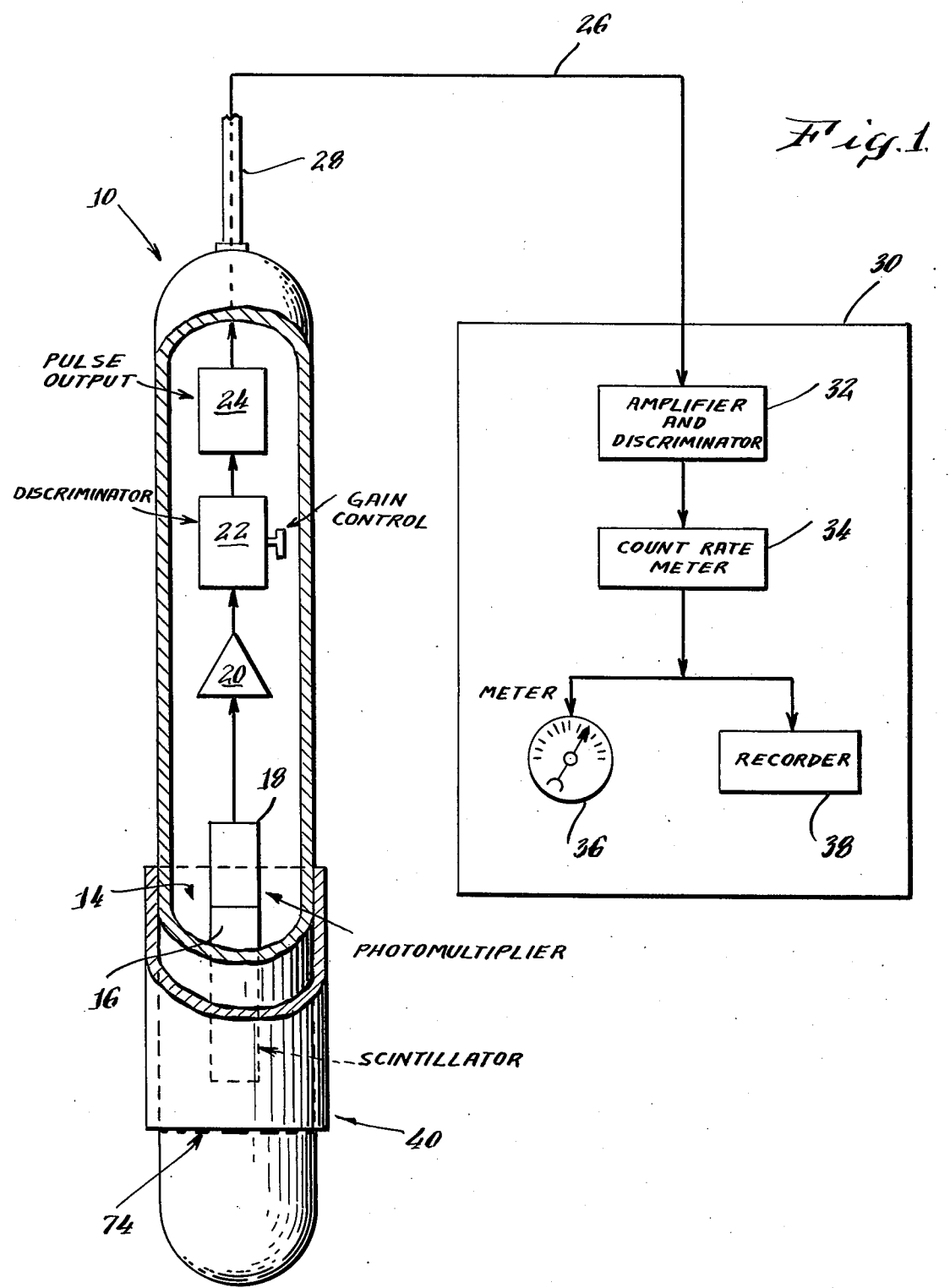
FIG. 1 is a schematic representation of a natural radioactivity well logging tool having a calibrator of the invention positioned around its detector.

FIG. 1 shows a logging tool 10 for measuring the natural radioactivity of earth formations, comprising an elongated fluid and pressure-tight housing 12. Within the housing 12 a scintillation detector 14, that includes a scintillator crystal 16 and a photomultiplier 18, responds to the natural gamma radioactivity of the adjacent formation. Other radiation detectors, such as a solid state germanium, cadmium telluride, or mercuric iodide detector, also may be used.

The output pulses of the photomultiplier 18 are first amplified in an amplifier 20 before being applied to a pulse height discriminator circuit 22 that passes only pulses above a selected amplitude in order to eliminate most of the spurious signals caused, for example, by "dark current" within the photomultiplier 18. These pulses are then prepared in a pulse output circuit 24 for transmission, through a conductor 26 in an armored cable 28, to a surface equipment 30.

In the surface equipment 30, the incoming pulses are received by an amplifier and discrimination circuit 32 and applied to a count rate meter 34 that converts the received pulses into an output signal corresponding to the natural gamma radioactivity registered at the detector 14. This signal is applied simultaneously to a meter 36 and a trace recorder 38.

During field operations, the above-described logging tool has to be periodically calibrated at the well site by adjusting the gain of the detection system so as to keep a constant count rate reading on the meter 36 when a calibrator containing a standard gamma ray source is placed at a reference position with respect to the detector 14. This gain adjustment can be performed by adjusting, with a gain control 39, either the high voltage source of the photomultiplier 18 or the amplifier 20 or, as shown in FIG. 1, the discriminator 22.

As can be seen from FIG. 1, the calibrator of the present invention is in the form of a sleeve 40 having a radioactive substance dispersed therein, that completely encircles the portion of the housing 12 containing the detector 14. The sleeve extends above and below the scintillator 16 and has an internal diameter which is substantially the same as the housing diameter (typically 3⅜ inches).

Figure 2A:
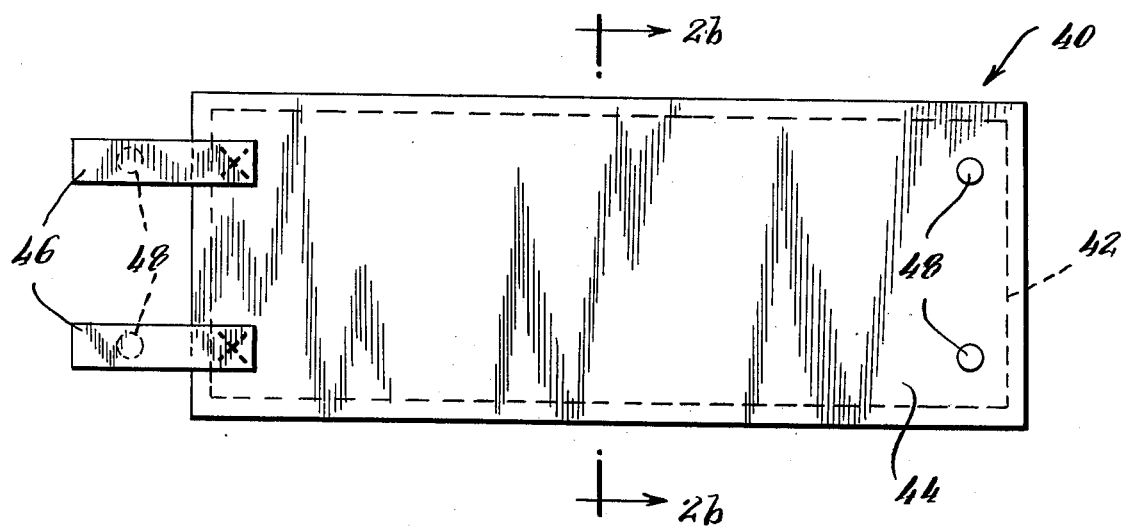
FIGS. 2a and 2b show a preferred embodiment of the invention.
Figure 2B:
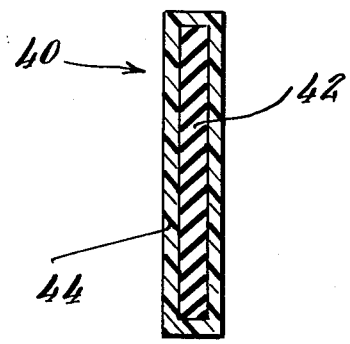

In accordance with the invention, the sleeve 40 is formed by a flexible rectangular flat pad which is wrapped around the housing 12. The pad is of sufficient size so as to completely encircle the tool and extend for about one tool diameter above and one tool diameter below the scintillator 16. As an example, for a housing diameter of 3⅜ inches and a 10-inch long scintillator, the pad will be 3⅜ inches in width and 18 inches in length. Referring to FIGS. 2a and 2b that represent this pad, the radioactive substance is dispersed within a tough, flexible sheet 42 of resilient material, such as an elastomer. Rubber is suitable, but polyurethane is more appropriate because of its easy fabrication and toughness. The sheet 42 is advantageously placed within a flexible protective sheath 44 made of nylon, for example. Straps 46 attached to the sheath 44 are used, with the help of press-studs 48, to hold the calibrator wrapped about the housing 12. Any other appropriate fastening means could also be used.

The radioactive substance dispersed within the flexible sheet 42 is preferably carnotite, whose chemical formula is $K(UO_2)_2 (VO_4)_2, n\ H_2O$. However, several other source materials, such as uranium 238, radium 226, cobalt 60 or cesium 137, can also be used.

The amount of radioactive substance dispersed within the pad is determined, in each case, so as to produce the desired count rate reading on the meter 36. It must be mentioned that, as the calibrator is very close to the detector, a very small amount of radioactive substance is needed. As an example, an 18-inch long sleeve containing 3.5 grams of carnotite and having a strength of 0.23 $\mu$Ci will provide approximately the same reading as a 100 $\mu$Ci pill of radium 226 located at 53 inches from the detector. There is practically no health hazard from this amount of carnotite.

In operation, the flexible radioactive pad 40 is simply wrapped around the portion of the housing 12 containing the scintillator 16, and the gain control 39 is adjusted to obtain the desired reading on the meter 36. Marks 74 csn be advantageously provided on the housing to show the exact position of the pad around the detector. Since the calibrator is as close as possible to the detector and surrounds it completely, the scattering effects from nearby objects and the errors due to the asymmetry of the detector are avoided. An accurate calibration of the tool can thus be performed.

It now becomes apparent that the calibrator of the invention is not only inexpensive, light, compact and durable, but also harmless, easy to use and able to perform accurate calibrations.

While there has been described what is at present considered to be a preferred embodiment of this invention, it will be obvious to those skilled in the art that various changes and modifications may be made therein without departing from the invention, and it is therefore intended that the following claims cover all such changes and modifications as fall within the true spirit and scope of the invention.

I claim:

1. A portable calibrator for radioactivity logging tools having a substantially cylindrical housing adapted to be moved in a borehole and a gamma radiation detector carried by said housing, said calibrator comprising:
   a flexible sheet that can be wrapped around the portion of said housing carrying the radiation detector and is of sufficient size so as to completely encircle said housing portion and to extend for about one housing diameter above and one housing diameter below said detector; and
   a radioactive substance dispersed within said sheet.

2. The calibrator of claim 1, further comprising means for holding said sheet wrapped around the housing.

3. The calibrator of claim 1, wherein said sheet is made of a resilient material.

4. The calibrator of claim 3, wherein said sheet is made of polyurethane.

5. The calibrator of claim 1, wherein said radioactive substance is carnotite.

6. The calibrator of claim 1, wherein said sheet is covered with a flexible sheath.

7. The calibrator of claim 6, wherein said sheath is made of nylon.

8. A portable calibrator for radioactivity logging tools having a substantially cylindrical housing adapted to be moved in a borehole and a gamma radiation detector carried by said housing, said calibrator comprising:
   a sheet of resilient material that can be wrapped around the portion of said housing carrying the radiation detector and is of sufficient size so as to completely encircle said housing portion and to extend for about one housing diameter above and one housing diameter below said detector;
   a radioactive substance dispersed within said sheet;
   a flexible sheath covering said sheet; and
   means attached to said sheath for holding it wrapped around the housing.

* * * * *